(12) United States Patent
Burger et al.

(10) Patent No.: US 7,305,666 B2
(45) Date of Patent: Dec. 4, 2007

(54) DESCRIPTION LANGUAGE FOR AN EXTENSIBLE COMPILER AND TOOLS INFRASTRUCTURE

(75) Inventors: Julian Burger, Bothell, WA (US); David Read Tarditi, Jr., Kirkland, WA (US); Charles L. Mitchell, Kirkland, WA (US); Andrew Edward Ayers, Kirkland, WA (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 10/626,251

(22) Filed: Jul. 23, 2003

(65) Prior Publication Data

US 2005/0022161 A1   Jan. 27, 2005

(51) Int. Cl.
*G06F 9/44* (2006.01)
*G06F 9/45* (2006.01)
(52) U.S. Cl. .................. 717/140; 717/106; 717/116; 717/151
(58) Field of Classification Search ............... 717/106, 717/140
See application file for complete search history.

(56) References Cited

U.S. PATENT DOCUMENTS

| | | |
|---|---|---|
| 4,197,978 A | 4/1980 | Kasper |
| 4,734,854 A | 3/1988 | Afshar |
| 5,339,419 A | 8/1994 | Chan et al. |
| 5,355,491 A | 10/1994 | Lawlor et al. |
| 5,488,727 A | 1/1996 | Agrawal et al. |
| 5,598,560 A | 1/1997 | Benson |
| 5,628,016 A | 5/1997 | Kukol |
| 5,659,753 A | 8/1997 | Murphy et al. |
| 5,696,974 A | 12/1997 | Agrawal et al. |

(Continued)

FOREIGN PATENT DOCUMENTS

EP    0 463 583    1/1992

(Continued)

OTHER PUBLICATIONS

Ramsey and Jones, "A single intermediate language that supports multiple implementations of exceptions," May 2000, ACM SIGPLAN Notices, PLDI 2000, vol. 35, Issue 5, ISBN:1-58113-199-2, pp. 285-298.

(Continued)

*Primary Examiner*—Tuan Dam
*Assistant Examiner*—Issac Tecklu
(74) *Attorney, Agent, or Firm*—Klarquist Sparkman, LLP

(57) ABSTRACT

Methods and systems are described herein for extending configuration dependent extensible software programs. Classes of a core extensible software program may be extended by adding a configuration dependent extension. The extensions may be added statically prior to compiling the core version of a software program or dynamically at runtime. The declaration of extensible core classes may include an extensibility attribute with an indication of whether the class is statically extensible or dynamically extensible. An object description language is also described herein for appropriately declaring configuration dependent extensible classes. Also, a pre-processor is described herein for processing the object description language to generate a source code representation of the extensible class declarations and their extensions. The source code representation may then be used to generate the extended version of the core software program.

33 Claims, 14 Drawing Sheets

U.S. PATENT DOCUMENTS

| | | | |
|---|---|---|---|
| 5,742,828 A | 4/1998 | Canady et al. | |
| 5,754,858 A | 5/1998 | Broman et al. | |
| 5,768,595 A | 6/1998 | Gillies | |
| 5,778,233 A | 7/1998 | Besaw et al. | |
| 5,857,105 A | 1/1999 | Ayers et al. | |
| 5,918,235 A | 6/1999 | Kirshenbaum et al. | |
| 5,937,195 A | 8/1999 | Ju et al. | |
| 5,943,499 A | 8/1999 | Gillies et al. | |
| 5,966,702 A | 10/1999 | Fresko et al. | |
| 5,999,739 A | 12/1999 | Soni et al. | |
| 6,009,273 A | 12/1999 | Ayers et al. | |
| 6,070,011 A | 5/2000 | Liu et al. | |
| 6,148,302 A | 11/2000 | Beylin et al. | |
| 6,149,318 A | 11/2000 | Chase et al. | |
| 6,182,284 B1 | 1/2001 | Sreedhar et al. | |
| 6,202,204 B1 | 3/2001 | Wu et al. | |
| 6,212,672 B1* | 4/2001 | Keller et al. | 717/104 |
| 6,247,169 B1 | 6/2001 | DeLong | |
| 6,249,910 B1 | 6/2001 | Ju et al. | |
| 6,253,304 B1 | 6/2001 | Hewitt et al. | |
| 6,286,134 B1 | 9/2001 | Click, Jr. et al. | |
| 6,289,446 B1 | 9/2001 | Nilsson | |
| 6,292,938 B1 | 9/2001 | Sarkar et al. | |
| 6,330,717 B1* | 12/2001 | Raverdy et al. | 717/170 |
| 6,353,924 B1 | 3/2002 | Ayers et al. | |
| 6,363,522 B1 | 3/2002 | Click et al. | |
| 6,374,368 B1 | 4/2002 | Mitchell et al. | |
| 6,412,109 B1 | 6/2002 | Ghosh | |
| 6,421,667 B1 | 7/2002 | Codd et al. | |
| 6,460,178 B1 | 10/2002 | Chan et al. | |
| 6,463,581 B1 | 10/2002 | Bacon et al. | |
| 6,481,008 B1 | 11/2002 | Chaiken et al. | |
| 6,526,570 B1 | 2/2003 | Click et al. | |
| 6,560,774 B1 | 5/2003 | Gordon et al. | |
| 6,578,090 B1 | 6/2003 | Motoyama et al. | |
| 6,598,220 B1 | 7/2003 | Valys et al. | |
| 6,625,804 B1 | 9/2003 | Ringseth et al. | |
| 6,625,808 B1 | 9/2003 | Tarditi | |
| 6,629,312 B1 | 9/2003 | Gupta | |
| 6,634,023 B1* | 10/2003 | Komatsu et al. | 717/159 |
| 6,662,356 B1 | 12/2003 | Edwards et al. | |
| 6,678,805 B1 | 1/2004 | Corduneanu et al. | |
| 6,745,383 B1 | 6/2004 | Agarwal et al. | |
| 6,748,584 B1 | 6/2004 | Witchel et al. | |
| 6,981,249 B1 | 12/2005 | Knoblock et al. | |
| 7,055,132 B2 | 5/2006 | Bogdan et al. | |
| 7,117,488 B1 | 10/2006 | Franz et al. | |
| 7,120,898 B2* | 10/2006 | Grover et al. | 717/114 |
| 2002/0083425 A1 | 6/2002 | Gillies et al. | |
| 2002/0095667 A1 | 7/2002 | Archambault | |
| 2002/0166115 A1 | 11/2002 | Sastry | |
| 2002/0170044 A1 | 11/2002 | Tarditi | |
| 2003/0101335 A1 | 5/2003 | Gillies et al. | |
| 2003/0101380 A1 | 5/2003 | Chaiken et al. | |
| 2003/0217196 A1 | 11/2003 | Chan et al. | |
| 2003/0217197 A1 | 11/2003 | Chan et al. | |
| 2003/0226133 A1 | 12/2003 | Grover | |
| 2004/0025152 A1 | 2/2004 | Ishizaki et al. | |
| 2004/0049769 A1 | 3/2004 | Lueh et al. | |
| 2004/0093604 A1 | 5/2004 | Demsey et al. | |
| 2004/0095387 A1 | 5/2004 | Demsey et al. | |
| 2004/0098710 A1 | 5/2004 | Radigan | |
| 2004/0098724 A1 | 5/2004 | Demsey et al. | |
| 2004/0098731 A1 | 5/2004 | Demsey et al. | |
| 2004/0172639 A1 | 9/2004 | Luo et al. | |

FOREIGN PATENT DOCUMENTS

| | | |
|---|---|---|
| EP | 0 665 493 | 8/1995 |
| EP | 0 757 313 | 2/1997 |
| EP | 1 049 010 | 11/2000 |
| WO | WO 01/48607 | 7/2001 |

OTHER PUBLICATIONS

Choi et al., "Efficient and precise modeling of exceptions for the analysis of Java programs," Sep. 1999, ACM SIGSOFT Software Engineering Notes, PASTE '99, vol. 24, Issue 5, ISSN:0163-5948, pp. 21-31.

Hennessy "Program optimization and exception handling," Jan. 1981, Proceedings of the 8th ACM SIGPLAN-SIGACT symposium on Principles of programming languages, ISBN:0-89791-029-X, pp. 200-206.

Woo et al., "Alias analysis for exceptions in Java," Jan. 2002, Australian Computer Science Communications, ACSC2002, vol. 24, Issue 1, ISBN-ISSN:1445-1336, 0-909925-82-8, pp. 321-329.

Robillard et al., "Analyzing exception flow in Java programs," Oct. 1999, ACM SIGSOFT Software Engineering Notes, ESEC/FSE-7, vol. 24, Issue 6, ISBN:3-540-66538-2, pp. 322-337.

Gosling "Java intermediate bytecodes," Mar. 1995, ACM SIGPLAN Notices, IR '95, vol. 30, Issue 3, ISSN:0362-1340, pp. 111-118.

Burke et al., "The Jalapeño dynamic optimizing compiler for Java," Jun. 1999, Proceedings of the ACM 1999 conference on Java Grande, ISBN:1-58113-161-5, pp. 129-141.

Litwak, "PURE Java™ 2," Dec. 1999, Sams Publishing, ISBN:0-672-31654-4, Chapter 10.

Kienle, "A SUIF Java Compiler," Aug. 1998, University of California Santa Barbara, Technical Report TRCS98-18, Section 5.9, 6.9, 8.3, and 9.2.15.

"C/C++ Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.

International Search Report, Sep. 1, 2005, PCT/US04/15965, 13 pages.

Hartoog et al., "Generation of Software Tools from Processor Descriptions for Hardware/Software Codesign," 1997 ACM.

Hamilton, "Technical correspondence: language integration in the common language runtime," ACM Press, Feb. 2003, ACM SIGPLAN Notices, vol. 38, Issue 2, pp. 19-28.

Arnold et al., "Exploring the Interaction between Java's Implicitly Thrown Exceptions and Instruction Scheduling", International Journal of Parallel Programming, vol. 29, Issue 2, Apr. 2001, pp. 111-137.

Gupta et al., "Optimizing Java Programs in the Presence of Exceptions", 2000, Lecture Notes in Computer Science; vol. 1850, ISBN:3-540-67660-0, pp. 422-446.

"Attribute-Based Templates for Microsoft .NET", 2001, Newtelligence AG, 7 pages.

"Common Language Infrastructure (CLI), Partition I: Concepts and Architecture," ECMA TC39/TG3, Section 11.6, pp. 1-103, Oct. 2002.

"The LEX & YACC Page," http://dinosaur.compilertools.net/, 4 pages, website visited on Jun. 16, 2003.

"SMGN Reference Manual," http://suif.stanford.edu/suif/suif2/doc-2.20-4/, pp. 1-3, May 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.

"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.

"Zephyr Computer Systems Description Languages (CSDL): Generating Machine-Dependent Compiler Parts Using CSDL," http://web.archive.org/web/20000829045324/www.cs.virginia.edu/zephyr/csdl/, 1 page, Aug. 29, 2000.

"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.

"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.

Adl-Tabatabai et al., "Code Reuse in an Optimizing Compiler," ACM SIGPLAN Notices, Proceedings of the Eleventh Annual Conference on Object-Oriented Programming Systems, Languages, and Applications, vol. 31, Issue 10, pp. 51-68, Oct. 1996.

Aigner et al., "An Overview of the SUIF2 Compiler Infrastructure," Technical Report, Computer Systems Laboratory, Stanford University and Portland Group, Inc., pp. 1-14, 2000.

Aigner et al., "SUIF Compiler System: The SUIF Program Representation," Computer Systems Laboratory, Stanford University and The Portland Group, Inc., http://suif.stanford.edu/suif/suif2/doc-2.2.0-4/suifguide/, pp. 1-30, Aug. 14, 2000.

Appel et al., "The Zephyr Compiler Infrastructure," Internal Report, http://www.cs.virginia.edu/zephyr, Princeton University and University of Virginia, pp. 1-10, Nov. 6, 1998.

Ayers et al., "Scalable Cross-Module Optimization," ACM SIGPLAN Notices, Proceedings of the ACM SIGPLAN 1998 Conference on Programming Language Design and Implementation, vol. 33, Issue 5, pp. 301-312, May 1998.

Benitez et al., "Target-Specific Global Code Improvement: Principles and Applications," Technical Report CS-94-92, Department of Computer Science, University of Virginia, pp. 1-14, 1994.

Blickstein et al., "The GEM Optimizing Compiler System," Digital Technical Journal, vol. 4, No. 4, Special Issue, pp. 1-17, 1992.

Brooks et al., "Design of An Optimizing, Dynamically Retargetable Compiler for Common Lisp," Proceedings of the 1986 ACM Conference on LISP and functional programming, pp. 67-85, Aug. 1986.

Devanbu, "Re-targetability in Software Tools," ACM SIGAPP Applied Computing Review, vol. 7, Issue 3, pp. 19-26, Sep. 1999.

Engler, "VCODE: A Retargetable, Extensible, Very Fast Dynamic Code Generation System," ACM SIGPLAN Notices, Proceedings of the ACM SIGPLAN 1996 Conference on Programming Language Design and Implementation, Vol. 31, Issue 5, pp. 160-170, May 1996.

Ganapathi et al., "Retargetable Compiler Code Generation," ACM Computing Surveys (CSUR), vol. 14, Issue 4, pp. 573-592, Dec. 1982.

Goodenough, "Exception Handling: Issues and a Proposed Notation," Communications of the ACM, vol. 18, No. 12, pp. 683-696, Dec. 1975.

Guilan et al., "Retargetable Cross Compilation Techniques—Comparison and Analysis of GCC and Zephyr," *ACM SIGPLAN Notices*, Technical Correspondence, vol. 37, Issue 6, pp. 38-44, Jun. 2002.

Hayes et al., "Component Design of Retargetable Program Analysis Tools that Reuse Intermediate Representations," Proceedings of the 22nd International Conference on Software Engineering, Limerick, Ireland, ACM, pp. 356-365, Jun. 2000.

Heine et al., "Interprocedural Program Analyses," ACM SIGPLAN 2000 Conference on Programming Language Design and Implementation, Vancouver, B.C., 22 pages, http://suif.stanford.edu/suif/suif2/doc-2.2.0-4/tutorial/analysis.ppt, Jun. 2000.

Heine, "An Overview of the SUIF2 Base Infrastructure," ACM SIGPLAN 2000 Conference on Programming Language Design and Implementation, Vancouver, B.C., 30 pages, http://suif.stanford.edu/suif/suif2/doc-2.2.0-4/tutorial/basesuif.ppt, Jun. 2000.

Holzle et al., "OSUIF: SUIF For Objects," ACM SIGPLAN 2000 Conference on Programming Language Design and Implementation, Vancouver, B.C., pp. 1-17, http://suif.stanford.edu/suif/suif2/doc-2.2.0-4/ tutorial/osuif-intro.ps, Jun. 2000.

Kessler et al., "EPIC—A Retargetable, Highly Optimizing Lisp Compiler," ACM SIGPLAN Notices, Proceedings of the 1986 SIGPLAN Symposium on Compiler Construction, vol. 21, Issue 7, pp. 118-130, Jul. 1986.

Khedker et al., "Bidirectional Data Flow Analysis: Myths and Reality," ACM SIGPLAN Notices, vol. 34, No. 6, pp. 47-57, Jun. 1999.

Kienle, "OSUIF: A Closer Look," ACM SIGPLAN 2000 Conference on Programming Language Design and Implementation, Vancouver, B.C., pp. 1-31, http://suif.stanford.edu/suif/suif2/doc-2.2.0-4/ tutorial/osuif-details.ps, Jun. 2000.

Knoop et al., "Lazy Code Motion," In Proceedings of the ACM SIGPLAN '92 Conference on Programming Language Design and Implementation, San Francisco, CA, 11 pages, Jun. 1992.

Knoop et al., "Partial Dead Code Elimination," In Proceedings of the ACM SIGPLAN '94 Conference on Programming Language Design and Implementation, 12 pages, Jun. 1994.

LAM, "An Overview of the SUIF2 System," ACM SIGPLAN '99 Conference on Programming Language Design and Implementation, Atlanta GA, 20 pages, http:suif.stanford.edu/suif/suif2/doc-2.2.0-4/ tutorial/suif-intro.ppt, May 4, 1999.

LIM, "Affine Partitioning for Parallelism & Locality," ACM SIGPLAN 2000 Conference on Programming Language Design and Implementation, Vancouver, B.C., 16 pages, http://suif.stanford.edu/suif/suif2/doc-2.2.0-4 tutorial/affine.ppt, Jun. 2000.

Morel et al., "Global Optimization by Suppression of Partial Redundancies," Communications of the ACM, vol. 22, No. 2, pp. 96-103, Feb. 1979.

Ramsey et al., "Machine Descriptions to Build Tools for Embedded Systems," Proceedings of the ACM SIGPLAN Workshop on Languages Compilers, and Tools for Embedded Systems, 17 pages, 1998.

Smith, "Machine SUIF," ACM SIGPLAN 2000 Conference on Programming Language Design and Implementation, Vancouver, B.C., 15 pages, Jun. 2000.

Stallman, "Using and Porting the GNU Compiler Collection," 504 pages, http://www.skyfree.org/linux/references/gcc-v3.pdf, Jul. 28, 1999.

Wegbreit, "Property Extraction in Well-Founded Property Sets," IEEE Transactions on Software Engineering, vol. 1, No. 3, pages 270-285, Sept. 1975.

Tarditi et al.; "No Assembly Required: Compiling Standard ML to C"; Kluwer Academic Publishers, 1990; pp. 1-16.

Okasaki et al.; "Call-by-Need and Continuation-passing Style"; Lisp and Symbolic Computation: An International Journal; Kluwer Academic Publishers, 1993; pp. 1-25.

Johnson et al.; "Dependence-Based Program Analysis"; ACM SIGPLAN'93 PLDI, Jun. 1993; pp. 1-12.

Ayguadé et al.; "A Uniform Internal Representation for High-Level and Instruction-Level Transformations"; 1994; pp. 1-25.

Weaver et al.; "Score: A Compiler Representation for Heterogeneous Systems"; Dec. 1995; pp. 1-14.

Saito et al.; "PROMIS IR Design"; Sep. 29, 1997; pp. 1-4.

Saito et al.; "PROMIS IR Implementation—AST Components—"; Sep. 29, 1997; pp. 1-4.

Polychronopoulos et al.; "The Promis Compiler Project—Annual Report"; Oct. 1, 1997; pp. 1-15.

Cho et al.; "High-Level Information—An Approach for Integrating Front-End and Back-End Compiler"; Aug. 1998; pp. cover page and 1-19.

Larus; "Whole Program Paths"; Proceedings of the SIGNPLAN'99 Conference on Programming Language Design and Implementation (PLDI 99), May 1999; pp. 1-11.

Fitzgerald et al.; "Marmot: An Optimizing Compiler for Java"; Technical Report MSR-TR-99-33; Jun. 16, 1999; pp. cover p. and 1-29.

Fitzgerald et al.; "The Case Profile-Directed Selection of Garbage Collectors"; 2000; pp. 1-10.

"1.3 Compiler Architecture" http://lambda.uta.edu/cse5317/notes/node5.html visited on May 20, 2003; pp. 1-2.

"Implementation of a Parallelizing Compiler with a Universal Intermediate Representations: Translating of Source Codes into Universal Intermediate Representations" http://www.ipsj.or.jp/members/SIGNotes/Eng/22/1997/017/article004.html visited on May 20, 2003; pp. 1-2.

"Scale Download"; Dept. of Computer Science, University of Massachusetts Amherst; http://www-ali.cs.umass.edu/Scale/download.html visited on May 20, 2003; pp. 1-13.

"Overview of the SA-C Compiler" http://www.cs.colostate.edu/Cameron/compiler.html visited on May 20, 2003; pp. 1-2.

"PROMIS Release Announcement" http://www.csrd.uiuc.edu/promis/release_announcement.html visited on May 20, 2003; pp. 1-3.

"Scale"; Dept. of Computer Science, University of Massachusetts Amherst; http://www-ali,cs.umass.edu/Scale/ visited on May 20, 2003; pp. 1-46.

"CIL: Infrastructure for C Program Analysis and Transformatio"; May 30, 2003; pp. 1-54.

"PROMIS Implementation—The Illinois-Irvine PROMIS Team" http://www.csrd.uiuc.edu/promis/ visited on Jun. 4, 2003; pp. 1-32.

"Illinois-Irvine PROMIS Compiler Internal Representation" http://www.csrd.uiuc.ed/promis/ visited on Jun. 4, 2003; pp. 1-17.

"Technical Overview" http://www.csrd.uiuc.edu/promis/overview.html visited on Jun. 4, 2003; pp. 1-2.

"A Parallelizing Compiler Framework" http://www.csrd.uiuc.edu/promis/home.html visited on Jun. 4, 2003; pp. 1-2.

"Demystifying .NET Compilation" http://www.zdnet.com.au/printfriendly?AT=2000035027-20264543, pp. 1-4, including 1 page of "Figure A", Apr. 12, 2002.

Harper et al., "Compiling Polymorphism Using Intensional Type Analysis", ACM Symposium on Principles of Programming Languages, pp. 130-141, Jan. 1995.

Tarditi et al., "TIL: A Type-Directed Optimizing Compiler for ML", 1996 SIGNPLAN Conference on Programming Language Design and Implementation, pp. 181-192, May 1996.

Tarditi, "Design and Implementation of Code Optimizations for a Type-Directed Compiler for Standard ML", PhD Thesis, Carnegie Mellon University, 6 pages of introduction and pp. i-266, Dec. 1996 (Available as Technical Report CMU-CS-97-108).

Morrisett et al., "Stack-Based Typed Assembly Language", Xavier Leroy and Atsushi Ohori, editors, Lecture Notes in Computer Science, vol. 1473, pp. 28-52, Mar. 1998.

Colby et al., "A Certifying Compiler for Java", 2000 SIGPLAN Conference on Programming Language Design and Implementation, pp. 95-107, Vancourver, Canada, Jun. 2000.

NECULA, "Compiling With Proofs", PhD thesis, Carnegie Mellon University, 27 pages, Sep. 1998.

Alpern et al., "Detecting Equality of Variables in Programs" Proceedings of the 15th ACM SIGPLAN-SIGACT Symposium on Principles of Programming Languages, pp. 1-11, 1988.

Bacon, "Fast and Effective Optimization of Statically Typed, Object-Oriented Languages", PhD thesis, Computer Science Division, University of California, Berkeley, 3 pages of introduction and pp. i-141, 1997.

Bodik et al., "ABCD: Eliminating Array Bounds Checks on Demand", Proceedings of ACM SIGPLAN 2000 Conference on Programming Language Design and Implementation, pp. 321-333.

Cytron, "Efficiently Computing Static Single Assignment Form and the Control Dependence Graph", ACM Transactions on Programming Languages and Systems, pp. 451-490, 1991.

Dean et al., "Optimizations of Object-Oriented Programs Using Static Class Hierachy Analysis", European Conference on Object-Oriented Programming, pp. 77-101, 1995.

Gay et al., "Fast Escape Analysis and Stack Allocation for Object-Based Programs", Proceedings of the 2000 International Conference on Compiler Construction, 12 pages, 2000.

Gupta, "Optimizing Array Bound Checks Using Flow Analysis", ACM Letters on Programming Languages and Systems, pp. 135-150, 1993.

Lengauer et al, "A Fast Algorithm for Finding Dominators in a Flowgraph", ACM Transactions on Programming Languages and Systems, pp. 121-141, 1979.

Mueller et al., "Avoiding Unconditional Jumps by Code Replications", Proceedings of the SIGPLAN '92 Conference on Programming Language Design and iMplementation, pp. 322-330, Jun. 1992.

Ruf, "Effective Synchronization Removal for Java", ACM SIGPLAN Conference on Programming Language Design and Implementation, pp. 208-218, BC, Canada, 2000.

Tarjan, "Testing Flow Graph Reducibility", Proceedings of the Fifth Annual ACM Symposium on Theory of Computing, pp. 96-107, 1973.

Vitek et al., "Efficient Type Inclusion Tests", Proceedings of OOPSLA '97, pp. 142-157, Atlanta, Georgia, 1997.

Sun Microsystems, Inc., "The Java Language Environment: 6—Security in Java, 6.3 The Byte Code Verification Process" http://web.archive.org/web/19990302092957/http://java.sun.com/docs/white/langenv/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)" pp. 1-10 (X/Open Company Ltd. 1996).

Cedilla System Inc., Products http://web.archive.org/web/20010728193511/www.cedillasystems.com/pages/about/procucts.html, 2 pages (Jul. 28, 2001).

Lee, A Certifying Compiler for Java http://www-2.cs.cmu.edu/~petel/pcc/pcc-slides/SDIPOP.pdf, 10 pages (Sep. 2000).

Aho et al., "Compilers: Principles, Techniques and Tools", Copyright © 1986 by Bell Telephone Laboratories, Inc., cover and pp. ii, vii-x, 12-14, 463-512, and 585-722.

Appel, "Modern Compiler Implementation in ML", Copyright © Andrew W. Appel, 1998, Cambridge University Press, cover and pp. iv-viii, 148-210, 344-376, and 427-467.

Fraser et al., "A Retargetable C Compiler: Design and Implementation", Copyright © 1995 by AT&T and David R. Hanson, cover and pp. iv, vii-xii, 311-372.

Tanenbaum et al., "A practical tool kit for making portable compilers," Communications of the Association for Computing Machinery, ACM, New York, NY, vol. 26(9):654-660, Sep. 1983.

Keller et al., "Binary Component Adaptation," European Conference on Object Oriented Programming (ECOOP), 12th European Conference Proceedings, Springer-Verlag Berlin, Germany, pp. 307-329, 1998.

Baum et al., "Generic components to foster reuse," Proceedings 37th International Conference on Technology of Object-Oriented Languages and Systems, Tool-Pacific 2000 IEEE Comput. Soc. Los Alamitos, CA, pp. 266-277, 2000.

Kiczales et al., "Aspect-oriented programming," European Conference on Object Oriented Programming (ECOOP), vol. 1241, pp. 220-242, Jun. 1997.

Chiba et al., "Josh: An Open AspectJ-like Language," Proceedings of the International Conference on Aspect-Oriented Software Development (AOSD), Lancaster, UK, pp. 102-111, Apr. 22, 2002.

* cited by examiner

FIG. 9A

```
911 →   Public [....]  ~913
        Class SYM {
912 →       PHX : : TYPE   TYPE; ~914
            NAME : : NAME ~915
        };
```
900

FIG. 9B

```
    927         928
Extend class SYM   [JIT]        925
Class JITSYM       {
    JIT RELATED EXTENSION ~926
}
Extend class SYM   [IA-64]      930
Class IA-64SYM     {
    IA-64 RELATED EXTENSION; ~931
}
```
920

FIG. 9C

```
Public
Class SYM          {
    PHX : : TYPE TYPE; ~914
    NAME : : NAME; ~915
    JIT RELATED EXTENSION; ~926
    IA-64 TARGET RELATED EXTENSION; ~931
}
```
940

FIG. 10A

```
Public [Extensible, gc]
Class   INSTR    {
        OPCODE
        SRC LIST
        DEST LIST
};
```

FIG. 10B

```
Public [gc, IA-64]
Class IA-64INSTR Extends Class INSTR    {
        HINTBITS     ~1021
        PREDICATES   ~1022
}
```

FIG. 10C

```
Class    INSTR    {
         OPCODE
         SRL LIST
         DESTLIST
         GET HINTBITS
         SET HINTBITS
         GET PREDICATE
         SET PREDICATE
}
```

Public [Extensible, gc]
Class INSTR {
    OPCODE
    SRL LIST
    DEST LIST
    Extension Point FOO(); ~1112

FIG. 11B
⟵ 1120

PUBLIC [gc, IA-64]
CLASS IA-64INSTR Extends Class INSTR {
    HINTBITS ~1121
    PREDICATES ~1122
    DEFINITION OF FOO () ~1123
};

DESCRIPTION LANGUAGE FOR AN EXTENSIBLE COMPILER AND TOOLS INFRASTRUCTURE

TECHNICAL FIELD

The technical field relates to extensible software systems. More particularly, it relates to use of extensible classes.

BACKGROUND

The field of computing is becoming more and more complex each day due to the proliferation of multiple programming languages, diverse processors, and multiple operating system environments. A number of programming languages with special capabilities (e.g., C++, Java, C#) are available now to provide programmers special advantages in programming various computing tasks. Similarly, various processors (e.g., X86, IA-64, AMD, etc.) are available to provide special advantages for executing particular tasks. For example, embedded processors are particularly suited for handling well defined tasks within electronic devices, whereas a general purpose processor such as an Intel® Pentium® processor is more flexible and can handle complex tasks. Thus, the diversity in computing environments, configurations and devices is increasing.

This increased need for diversity has complicated the already highly complex field of building compiler programs. Traditionally, compiler programs were written to compile software written in a particular source code language and were targeted to a particular type of processor architecture (e.g., IA-64, X86, AMD, ARM etc.). More recently, translator programs have been introduced that convert programs written in multiple source code languages to a single intermediate language representation (e.g., CIL (C++ Intermediate Language) and MSIL (Microsoft® Intermediate Language for .NET)). However, it is still complex and time consuming to retarget the compilation of one source code program among several different types of target architectures.

One suitable method for reducing the complexities of building compilers and other software development tools (e.g., analysis tools, optimizers) for multiple software development scenarios such as multiple languages and multiple targets is to develop an extensible core infrastructure or framework to which software extensions can be added to build specially configured compilers and other software development tools. For example, if a user wants to build a just-in-time (JIT) compiler configured for a certain target architecture, his or her task may be made easier by generating the JIT compiler by reusing the code of a core compiler framework and adding extensions with code specific to the JIT compiler type scenario. The same can be imagined for other software development tools such as optimizing tools, analysis tools, performance tools, testing tools, etc.

Building such customized compilers and other software development tools using such an extensible core compiler and tools framework is not without its own set of complexities. This is particularly true for an extensible compiler and tools framework that can be configured in multiple different ways to reflect multiple different software scenarios depending on languages, target architectures, and compiler types to be built (e.g., JIT, Pre-JIT, Native Optimizing Compiler etc.). One such complexity is related to defining data structures (e.g., object classes in a object-oriented language) of the core framework in a extensible manner such that extension fields dependent on multiple different software scenarios can be added to extend the data structures of the core framework. Traditional techniques of adding extension fields to a class definition can be used, but only at a hefty price paid for by reduced performance and increased code complexity, which can result in increased development and maintenance costs.

Thus, there is a need for a simple, but effective way for extending the object classes of a core framework software system using multiple different class extensions which depend on multiple different possible software development scenarios.

SUMMARY

Methods and systems are described herein for extending a software program by providing configuration dependent extended classes. In one aspect, class extensions dependent on various software development scenarios may be provided and added to extend core classes. Various class extensions may be combined to develop specially configured classes. In one aspect, classes of a core software program may be defined as either statically or dynamically extensible. If core classes are declared to be statically extensible, a header file combining the core class definitions and their corresponding class extensions may be generated and compiled together to generate an extended class. Such an extended class may be used to extend the core software program in a configuration dependent manner.

However, if a core class is declared to be dynamically extensible at runtime, then separate header files comprising the core class declarations and separate files comprising extension declarations may be generated. The header files corresponding to the core classes and those corresponding to class extensions are then separately compiled to generate computer-executable files with links to each other such that the class extensions are added to extend the core classes at runtime.

In yet another aspect, extension points may be provided within core class declarations to specifically indicate the point within the core class declarations where class extensions should be injected. An object description language with the appropriate syntax for defining extensible classes and class extensions is also described herein.

Also, as described herein is a pre-processor program capable of receiving input in an object description language and generating output in a source code representation to produce an extended version of the software program. In another aspect, the pre-processor is capable of generating output in any language that can eventually be compiled to a form executable by a computer.

BRIEF DESCRIPTION OF DRAWINGS

FIG. 9A is a listing of a core class declaration of a statically extensible core class in an object description language.

FIG. 9B is a listing of two class extensions to the statically extensible core class declaration of FIG. 9A.

FIG. 9C is a listing of a source code representation of an extended class declaration generated by associating the core class declaration of FIG. 9A with the class extensions of FIG. 9B.

FIG. 10A is a listing of a core class declaration of a dynamically extensible core class in an object description language.

FIG. 10B is a listing of an extension to the dynamically extensible core class declaration of FIG. 10A.

FIG. 10C is a listing of a source code representation of an extended class declaration generated by associating the core class declaration of FIG. 10A with the class extension of FIG. 10B.

FIG. 11A is a listing of a core class declaration indicating extension points for injecting class extensions.

FIG. 11B is a listing of an extension to the core class definition of FIG. 11A.

DETAILED DESCRIPTION

Exemplary Software Development Tools

Although the technologies described herein have been primarily illustrated via examples using compilers, any of the technologies can be used in conjunction with other software development tools (e.g., debuggers, optimizers, disassemblers, simulators and software analysis tools).

An Extensible Software Development Tool Framework

Figure 1:
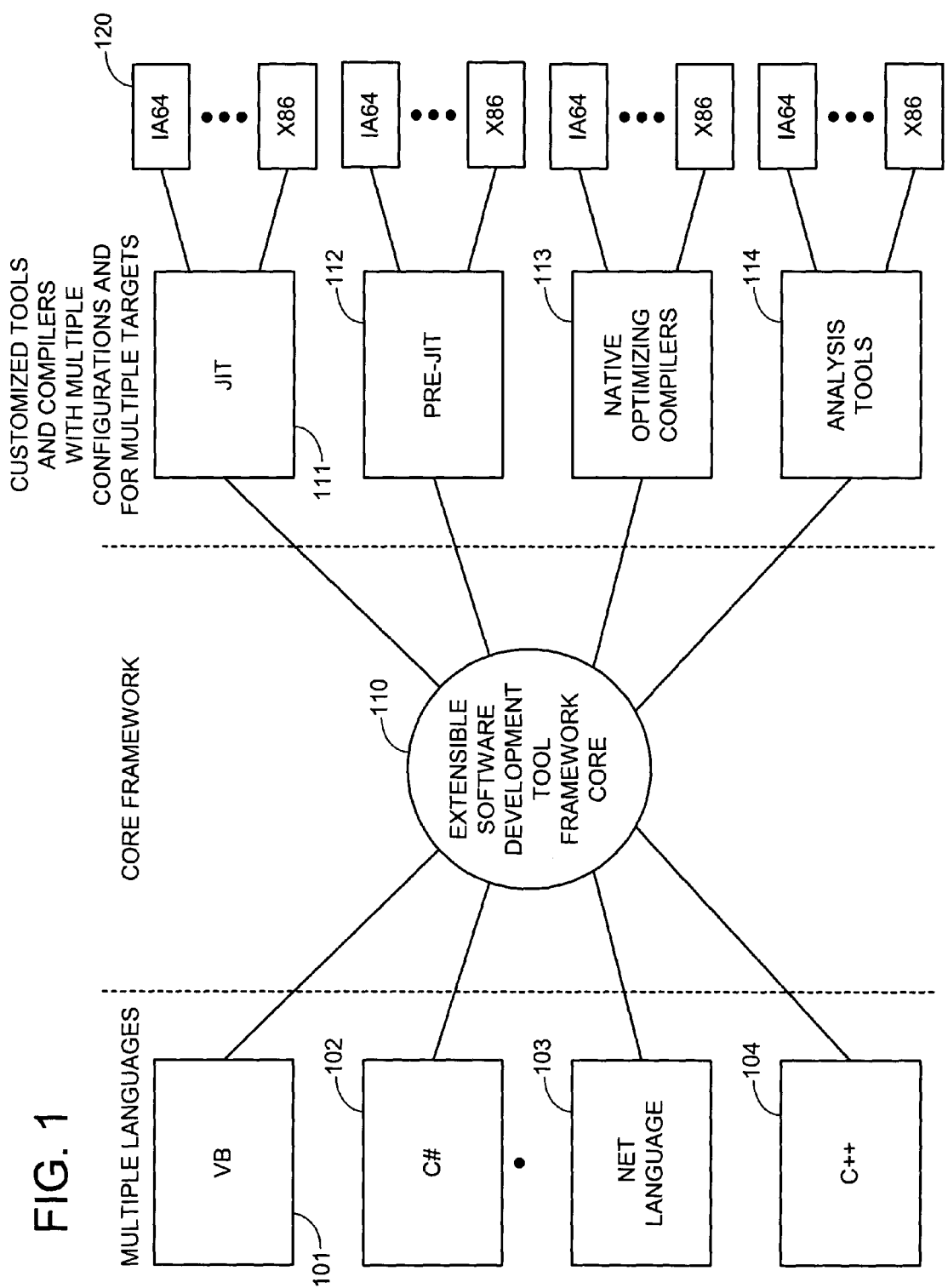
FIG. 1 is a block diagram showing an exemplary configuration dependent extensible core software framework.

FIG. 1 illustrates an exemplary core software framework that may be extended to build custom compilers and other software development tools of multiple different configurations to reflect multiple software development scenarios. The core 110 provides an extensible architecture that can be used as a building block to build customized software development tools 111-114. The core 110 software can be extended by adding software extensions related to one or more software development scenarios. For example, a JIT (Just-In-Time) compiler 111 targeting an IA-64 processor 121 may be built by providing software extensions to the core 110. In this case, the fact that the compiler is a JIT compiler 111 and that is being targeted for a particular processor architecture (IA-64 processor at 121) may determine the form and content of the software extensions to the core 110. Thus, software extensions related to the JIT compiler scenario and the IA-64 target scenario may be used to specify a configuration for building a customized software development tool. Other scenario factors such as the source languages 101-104 and the features of the tool that may be turned on or turned off based on particular software development scenarios may also add complexity to the task of building custom software development tools by extending a standard core framework such as the one in FIG. 1.

Exemplary Software Development Scenarios

There may be numerous software development scenarios that can influence the choice of software extensions to be incorporated into a core framework 110. For example, a software development scenario for a particular software development tool may include various processor architectures (e.g., IA-64, X86, AMD, ARM etc.) to which the tool will be targeted. Also, software development scenarios may be related to a type of compilation being performed (e.g., JIT, Pre-JIT, Native Optimizing Compiler). Software development scenarios may also be related to other types functionality performed by the software development tool such as type of analysis, optimization, simulation, debugging, code generation etc. Yet another software development scenario may be related to a particular programming language (e.g., Java, C++, C# etc.) for which the software development tool may be specially configured. Furthermore, software development scenarios may also relate to whether the tool is to be used with a managed execution environment (e.g., Microsoft CLR's environment provided by the Microsoft .NET Framework) or not. The above examples provide a limited set of software development scenarios or factors that may affect the choice of extensions needed to properly extend a core framework 110. Similarly, other scenarios can also influence the choice of software extensions needed to configure a custom software development tool. A collection of such scenarios may be referred to as a configuration. However, a particular configuration of a custom software development tool may be influenced by a single scenario.

Exemplary Objects

In object-oriented programming, objects can be used to store data and access functionality for the data. Objects are defined by providing class definitions which may then be used to instantiate an object belonging to that class.

Figure 2A:
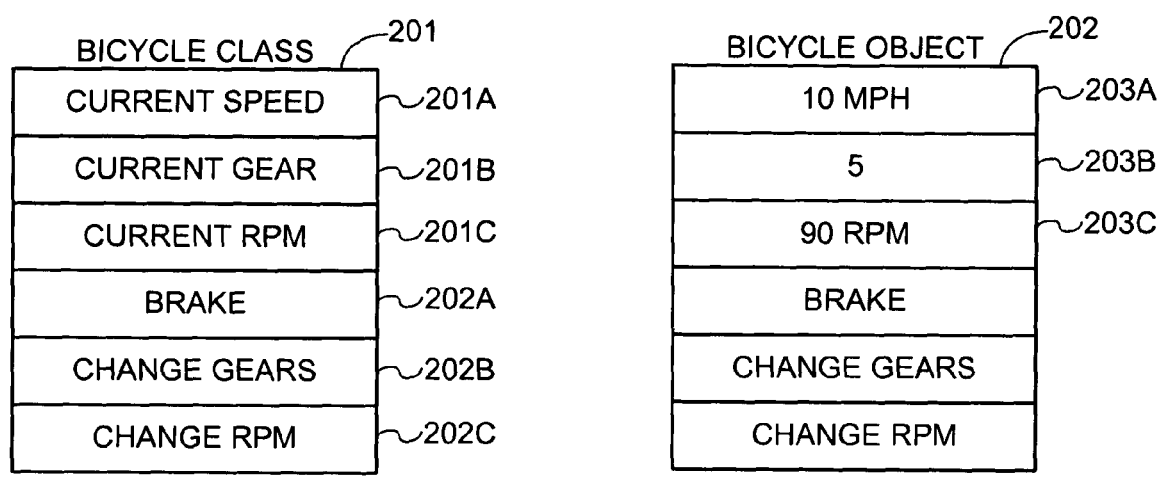
FIG. 2A is a block diagram illustrating data structures implemented as classes and objects in an exemplary object oriented programming language.

FIG. 2A illustrates a class definition 201 for an exemplary type "bicycle" having variable or data members (e.g., or fields) 201A-C and methods 202A-C. A specific instance of a class 201 is an object 202. Generally speaking, the data members may describe the state of an object, whereas the methods are used to ascribe behaviors to the object. In this example, the variables 201A-C are given specific values 202A-C when an object 202 of class 201 is instantiated. Data members and methods are sometimes collectively referred to as "class members."

Similarly, class definitions for an extensible core framework such as 110 may be provided to describe the data structures needed to implement the core 110. Furthermore, to extend the core framework 110 according to various software development scenarios, the core classes may be changed or extended depending on such software development scenarios.

Exemplary Software Extensions

One manner of extending a core software framework according to chosen software development scenarios is to extend the software classes. Software classes can be extended by changing the definitions of the object classes.

Exemplary class extensions can include one or more class extension members (e.g., data members or methods). When the class is extended, the class definition is modified to include the specified class extension members.

Thus, core classes may be extended by having additional class members defined and incorporated into their core class definitions. These additional class members may be referred to as class extension members that extend the core classes. Collectively, such class extension members can be called a "class extension."

The class extensions can vary greatly in a number of different ways. For example, certain class members required for some class extensions may not be required for others. Also, methods, functions and interfaces within a certain class extension may not be present at all in others, or, if they are present, may be defined differently. Such class extension members may relate to a software development scenario. For instance, the extra fields or class members to be added to a core class of a compiler framework to build a JIT compiler 111 may be far fewer than the number of fields or class members that may be required for a class extension related to a Native Optimizing Compiler 113.

Exemplary Software Development Scenario Class Extension Sets

Once the software development scenarios for configuring a software development tool are determined by a developer, their respective class extensions can be specified to develop an extended version of a core software framework. Appropriate software (e.g., a preprocessor or compiler) can then receive the specified scenario and include the set of extensions appropriate for the scenario. Thus, class extensions for a particular software development scenario can be grouped into a software development scenario class extension set having one or more class extensions appropriate for the scenario. The software development scenario class extension set can be invoked to extend the appropriate classes when developing a software development tool. The classes can be extended during development or at run time.

For example, various software classes are used to implement the core 110. If a developer specifies the software development scenarios of JIT compilation and IA-64 target architecture, the class extensions related to a JIT compiler and the class extensions related to an IA-64 target architecture are incorporated into core class definitions to extend the classes of a core framework 110 to be used in generating an extended version of core framework.

Expressing the Relationship Between Core Classes and their Extensions

Figure 2B:
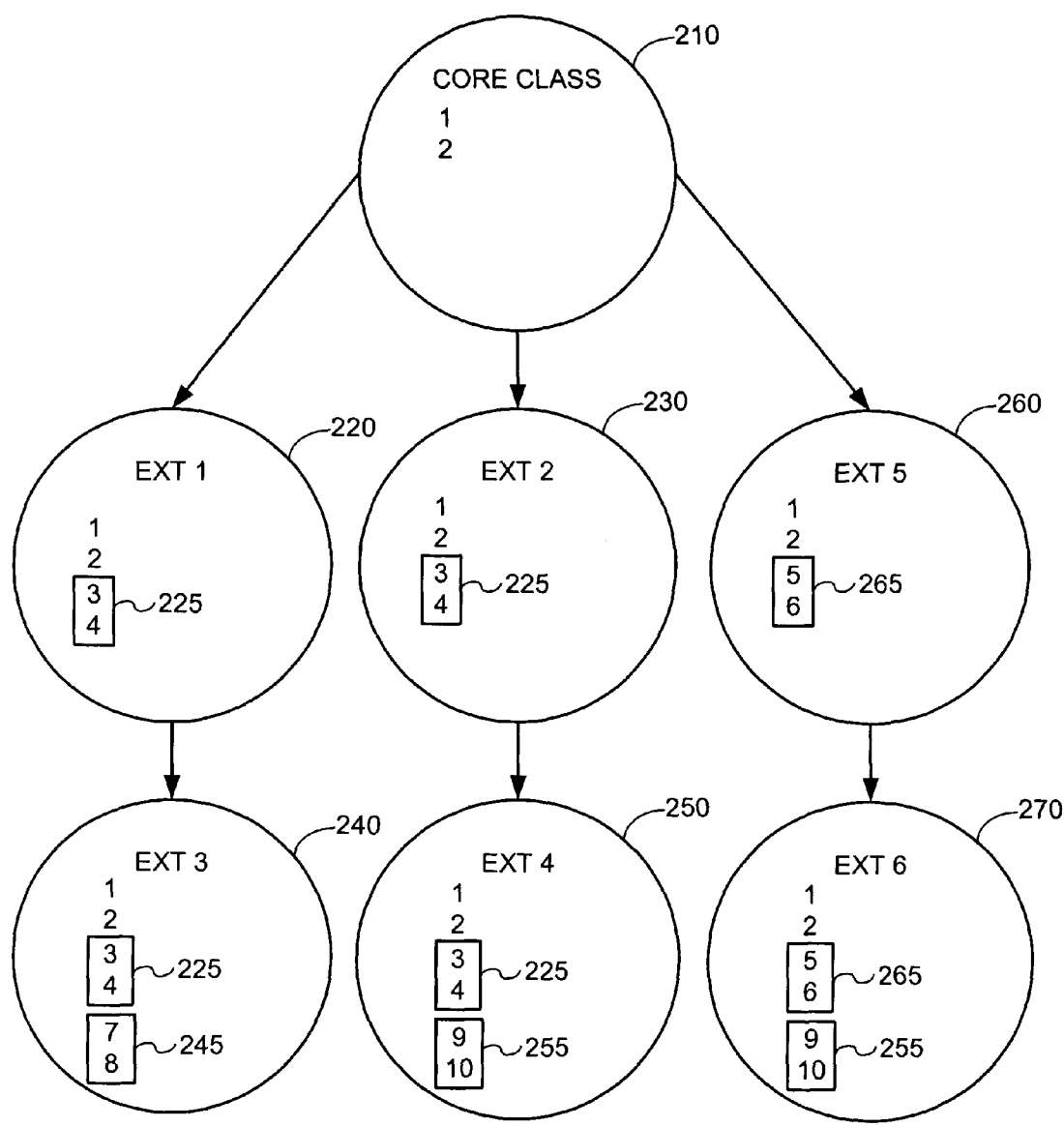
FIG. 2B is a block diagram showing the relationship between classes of an extensible core software program and its corresponding extensions.

FIG. 2B is a block diagram illustrating the relationship between core class definitions and their class extensions. The core node 210 may be related to a definition of a core class and is shown as having class members 1 and 2. The extended class definition at 220 may be necessary for implementing particular software development scenarios, and it may add additional class members 3 and 4 through an extension 225. Extended class definition 230 is the same as 220 and may be generated by adding the same additional class members 3 and 4 at extension 225 to the core class definition 210. However, the extended class definition 260 is different and may be generated by adding additional class members 5 and 6 at extension 265. In a similar manner, extended class definitions 240 and 250 may be extended by adding extensions 245, and 255 to the class definitions 220 and 230, respectively. Also, the extended class definitions 270 may be generated by adding extension 255 to the extended class definition 260.

In the example of FIG. 2B, class extensions are illustrated as having more than one class extension member. However, a class extension may have one or more class extension members, or it may replace one or more existing class members of the core class definition. Furthermore, a class extension may be in the form of a definition of a function of a method member found in the core class definition.

Thus, extensions of class definitions for a core software development tool framework can be represented as shown in FIG. 2B with additional class extensions depending a compilation scenario (JIT, Pre-JIT, Native Optimizing Compiler etc.), language scenario (C#, Visual Basic etc.), target scenario (IA-64, X86, AMD, ARM etc.) and other variables that may influence a particular configuration of an extended version of the exemplary extensible software development tool framework of FIG. 1.

However, representing or expressing the class extensions for a core framework with a particular configuration which may depend on a multitude of software development scenarios (i.e., target, compilation etc.) can soon get very complicated. For example, FIG. 2B depicts some simplified extension cases whereby the extended class definitions 220, 230, 240 and 250 inherit from previously defined classes in an orderly fashion without any single extension being used to extend multiple parent classes. However, this may not be the case when representing the extended class for a particular configuration of a software development tool that at various levels in class hierarchy may need to be extended in multiple different ways.

For example, it is possible that some of the same extensions may need to be used to extend multiple parent classes, instead of extending a single parent class. For example, the extension 255 may be used to extend the class definition 230 as well as the class definition 260. Thus, depending on a software development scenario, the same extension may be used to extend diverse parent classes. Such possibility of multiple inheritances when combined with the sheer number of software development scenarios and related extension configurations place an enormous burden on computer programmers.

In one approach, the relationship between the core class definitions and the definitions of the extended core classes can be programmed as a chain of inheritances between base classes and their sub-classes. However, such an approach tends to result in class bloat and can soon become burdensome to a programmer. With this approach, the programmer has the task of not only manually developing the extension sub-classes but he or she also has the added task of destroying unused objects to manage the use of limited memory resources.

Yet another manual approach to extending a base class definition may be the use of IF-DEF statements or other methods for implementing conditional compilation. In such an approach, the programmer may provide a base class definition and manually add IF-DEF statements or other conditional compilation statements including definition of extensions in their body to conditionally add the extensions to the base. This approach does have the advantage of extending classes only when needed, and thus, may be a better approach than generating a new sub-class for each extension, which can result in unwanted overhead. However, this approach is also manual in nature and requires a programmer to include IF-DEF statements in numerous locations for each possible configuration, causing the code to be littered with a multitude of such IF-DEF statements.

Figure 3A:
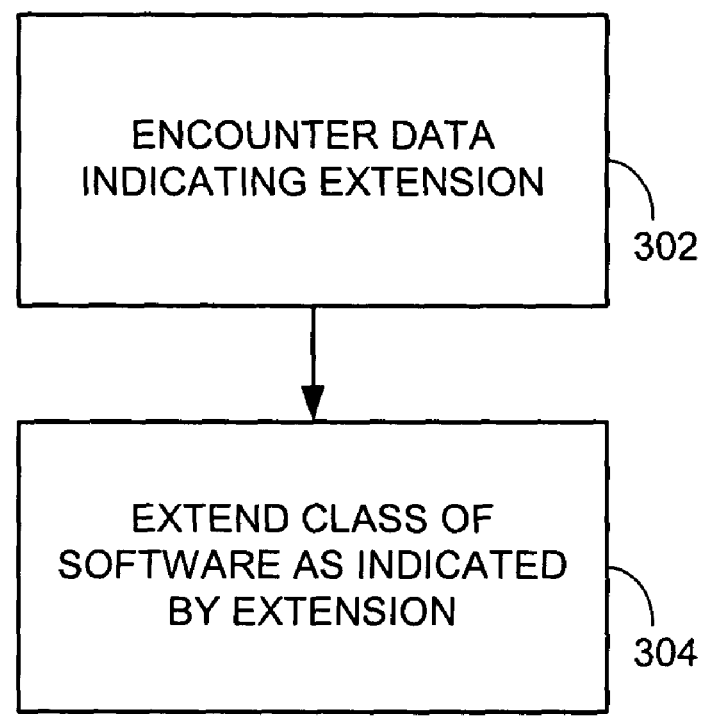
FIG. 3A is a flow chart of an overall method for extending a class definition by adding class extensions.

An Exemplary Overall Process for Generation of Class Extensions and their Associations to a Core Class Using an Object Description Language FIG. 3A depicts an overall process for extending a core class definition for building a compiler or a tool by extending a core framework. First, data indicating an extension is encountered at 302 and at 304 the class of the software development tool is extended as indicated by the extension.

Figure 3B:
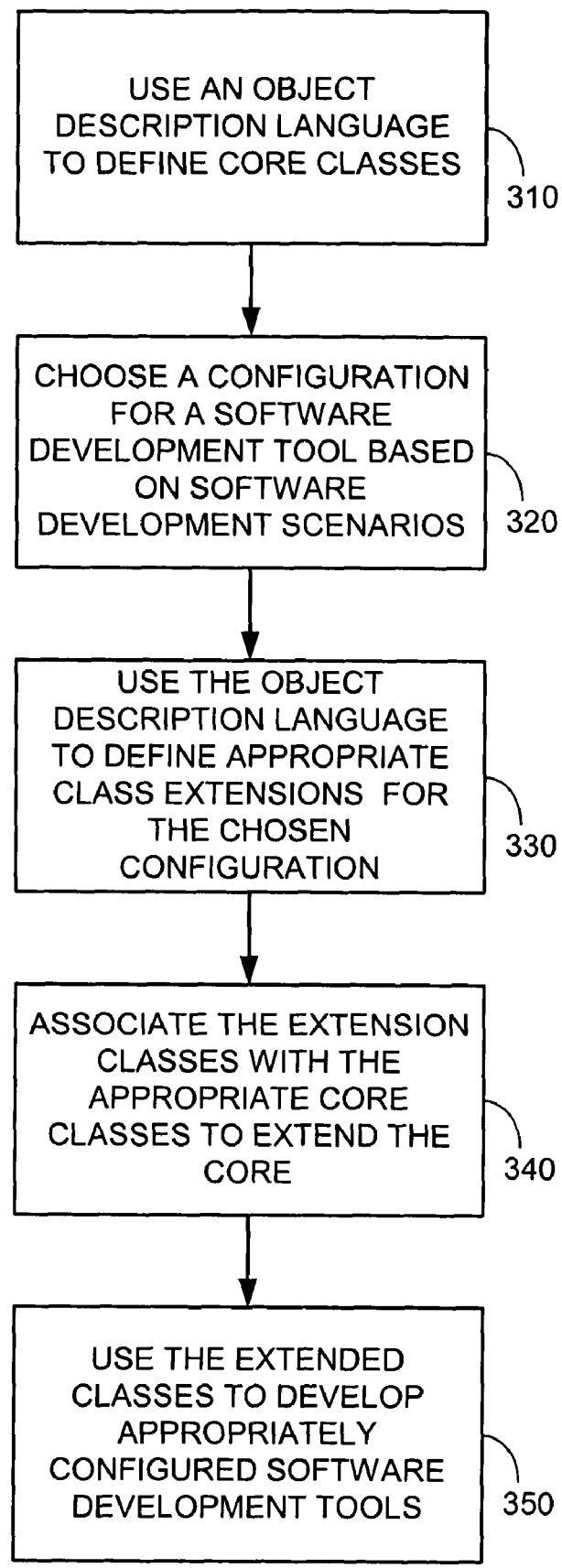
FIG. 3B is a flowchart of an overall method for generating a configuration dependent extended version of a core software program.

FIG. 3B describes an overall process for building a compiler or a software development tool by using software scenario dependent extensions for extending a core framework. At 310, a simplified object definition language (ODL) may be used to define the core classes. Then at 320, the configuration for a particular software development tool based on software development scenarios including its compiler type scenario, and the particular target scenario that it is being built for may be determined. Then, based on each scenario factor that influences a configuration, the object description language may be used to define the extensions at 330 to represent the additional or different class extension members needed to extend the core class. At 340, the extension may be associated with a core class to appropriately extend the core class definition. The syntax for the object description language should provide for defining core classes as being extensible or not and further to associate a particular set of class extension members as extensions of a selected core class. An appropriate syntax for such a description language is described with examples further below. Furthermore, a pre-processor translation program may be used to translate the data or the object description language to source code of a programming language. After such pre-processing, at 350, the extended class definition may be processed further and used to implement a compiler or other software development tools of a particular configuration by extending a core framework.

Using the process above, multiple different definitions of extensions can be provided separately and each extension can simply extend the core or the base class as necessary without having to maintain any complex inheritance relationships. The programmers providing a particular extension of a core class need not be aware of the other extensions of the core class. This not only simplifies the task of defining the extensions, but also, the users of the extended core class need only be aware of core class names to use the extended core class. Thus, the programmers can be freed from the task of remembering complex hierarchical relationships among class definitions when using extended class definitions.

Figure 4A:
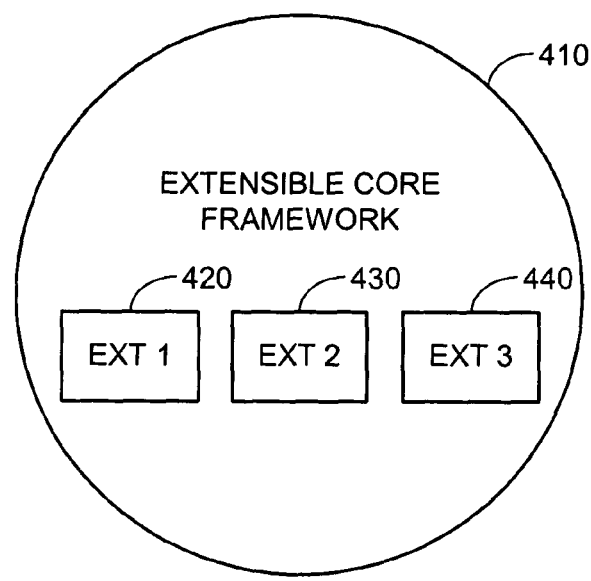
FIG. 4A is a block diagram depicting an extended version of a core software framework, wherein the extension was implemented statically prior to compile time.

Extending a Core Framework Program Dynamically at Runtime and Extending a Core Framework Program Statically Prior to Compiling the Core Program One approach for extending a core framework program may be to obtain access to the source code files of the core program and to statically extend the core classes as needed by using the object description language to define the extensions, which may then be processed to generate the source code related to the extended classes. Alternatively, the extended classes may be generated by manually adding the extensions directly to the source code in a source code programming language. FIG. 4A illustrates this approach whereby the extensions 420, 430 and 440 are added to the core framework file 410 in order to extend it and then the extensions 420, 430 and 440 are compiled as part of the now extended core framework file 410.

Figure 4B:
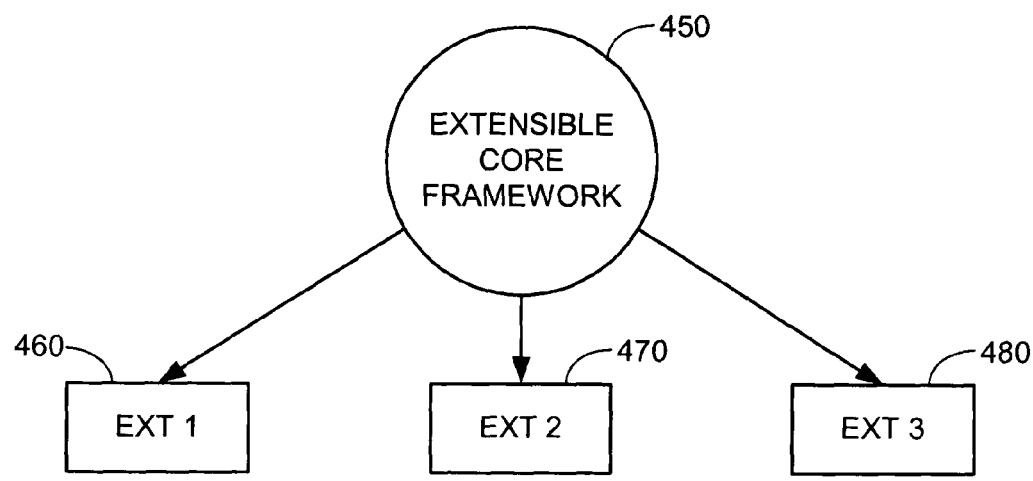
FIG. 4B is a block diagram depicting an extended version of a core software program, wherein the extension was implemented dynamically at runtime.

However, this approach may not be suitable for all purposes because the programmers providing the definition of the extensions such as 420, 430 and 440 will need to have access to the source code of the core framework 410. This may not be desirable in circumstances where the providers of the core framework 410 wish to keep the core framework source code secret or unchanged. In that case, the second approach depicted in FIG. 4B may be used, whereby the core compiler and tools framework 450 is compiled as a separate file from the extensions 460, 470, and 480.

In the second approach, the extensions 460, 470 and 480 and the core framework 450 may be adapted to have links to each other such that at runtime the extensions are linked to the core framework to appropriately extend the core framework. The links may be implemented as a simple linked list that specifies which extensions are to be used to extend particular core classes. This may also be achieved by using simple naming conventions that appropriately relate the extensions to the core classes as and when needed. In comparison to the first approach, this second approach may require additional overhead processing related to aspect of linking at runtime and thus, may be a slower implementation. On the other hand, this second approach does provide the flexibility of allowing the extending of a core class by developers not having access to the source code of the core framework.

An Exemplary Method for Extending a Core Class Statically Prior to Compilation

Figure 5:
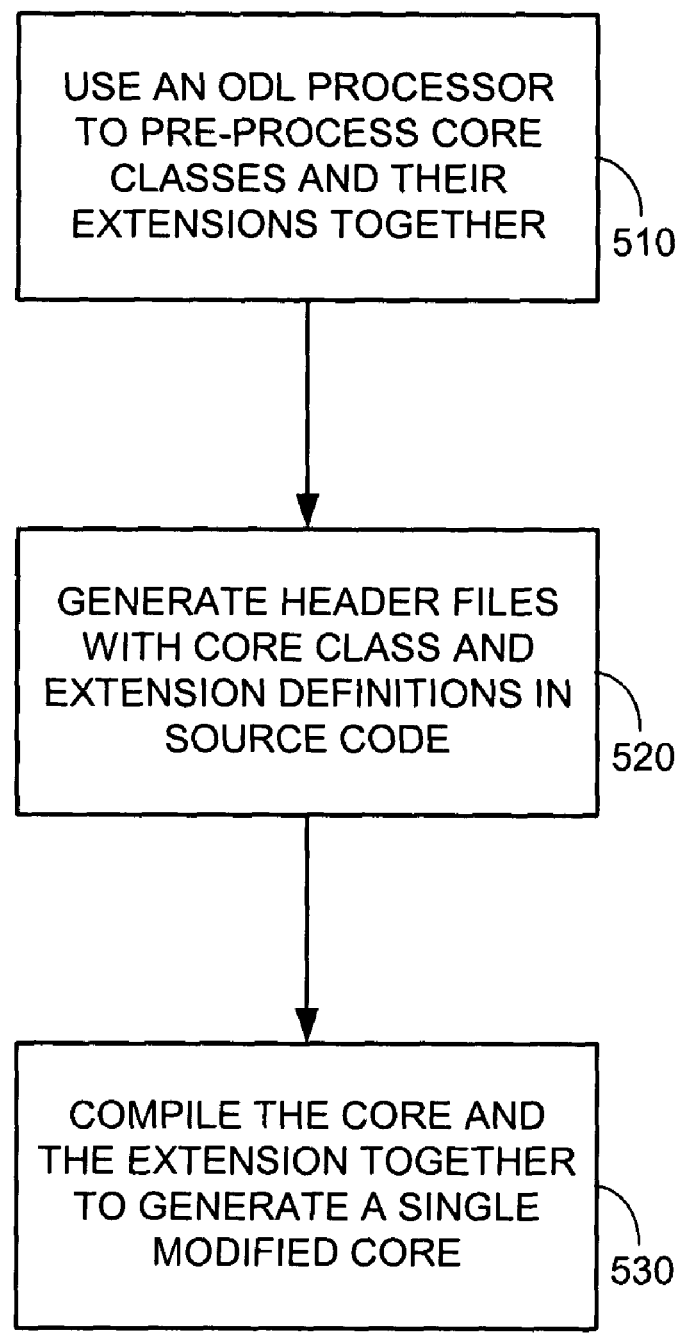
FIG. 5 is a flow chart of a method for statically extending a core software program.

FIG. 5 illustrates a method for statically extending classes related to a core framework program prior to compile time as shown with reference to FIG. 4A above. The core classes and their extensions may be defined using an object description language. The definitions of the core classes and the class extensions need not be generated simultaneously or together. However, adding the class extensions would require some access to the source code of the core program. Once such class definitions are obtained, then at 510, the definitions of the core classes and their extensions would together be processed by an ODL pre-processor which can translate an object description language representation to a source code representation. Thus at 520, the result of the pre-processing by the ODL processor would be a header file and possibly some other code expressing the definitions of the core classes and their extensions in a source code language such C++. Further at 530, the header file with the extended class definitions comprising the core class members and the class extension members would then be compiled along with the rest of the code related to the now extended core framework to generate custom configured compilers and other software development tools.

Figure 6:
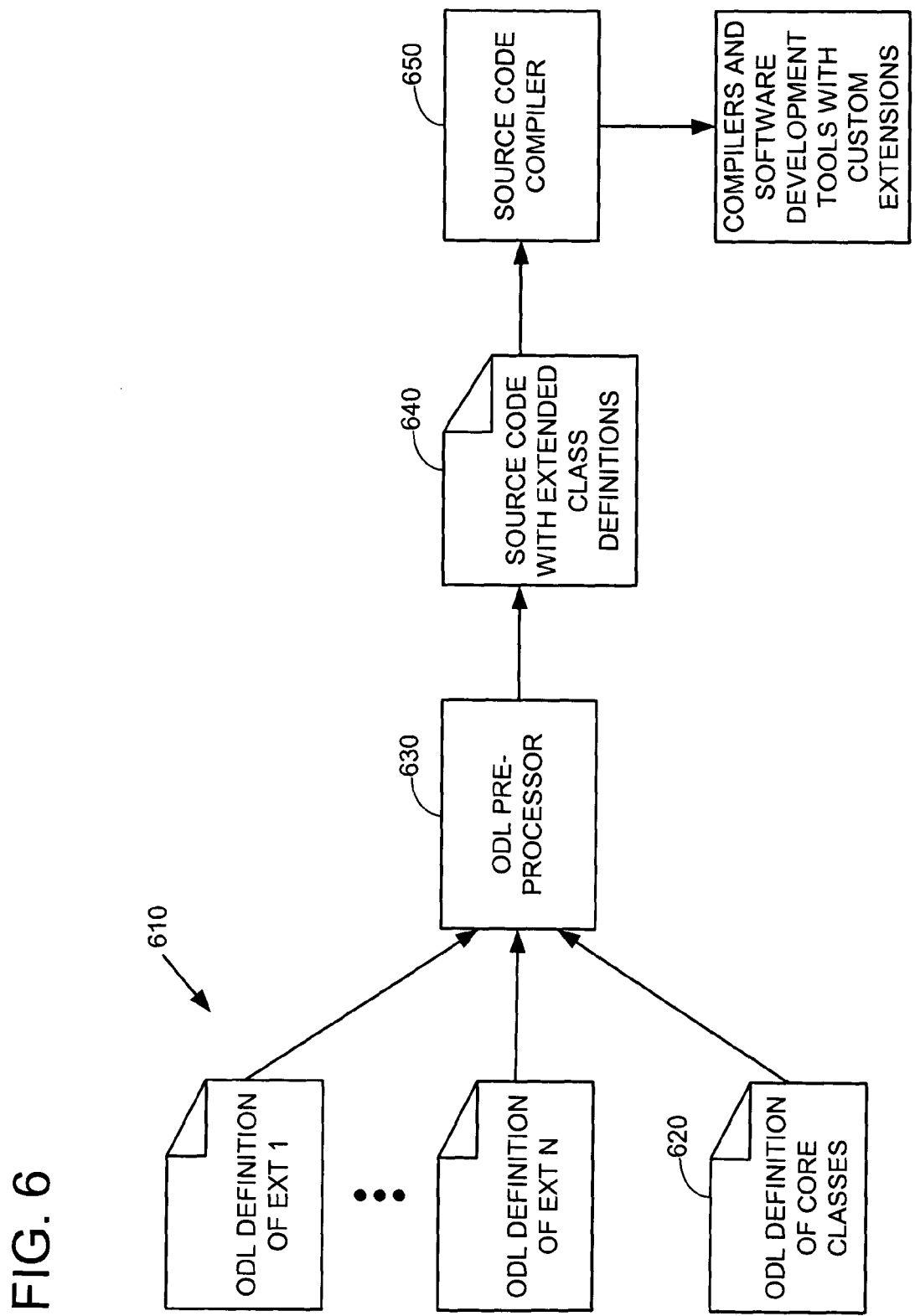
FIG. 6 is a block diagram depicting a system for statically extending a core software program as shown in FIG. 5.

FIG. 6 illustrates an exemplary system for implementing the process of FIG. 5. As shown in FIG. 6, multiple definitions of extensions 610 to core class definitions 620 can be stored as object description language files. An ODL pre-processor 630 may be provided which is capable of receiving the files 610 and 620 corresponding to the core class definitions and class extension definitions respectively.

The pre-processor should also be capable of translating the files 610 and 620 from their object description language form to a source code representation 640. The source code representation can be in any language that can be eventually compiled to a form executable by a computer processor. The source code 640 generated by the pre-processor 630 may include header files where class definitions are typically stored. A source code compiler 650 appropriate for the language of the source code 640 emitted by the pre-processor 630 may be provided for compiling the source code representation 640 to create customized extended versions of core software programs such as compliers and other software development tools.

An Exemplary Method for Extending a Core Class Dynamically at Runtime

Figure 7:
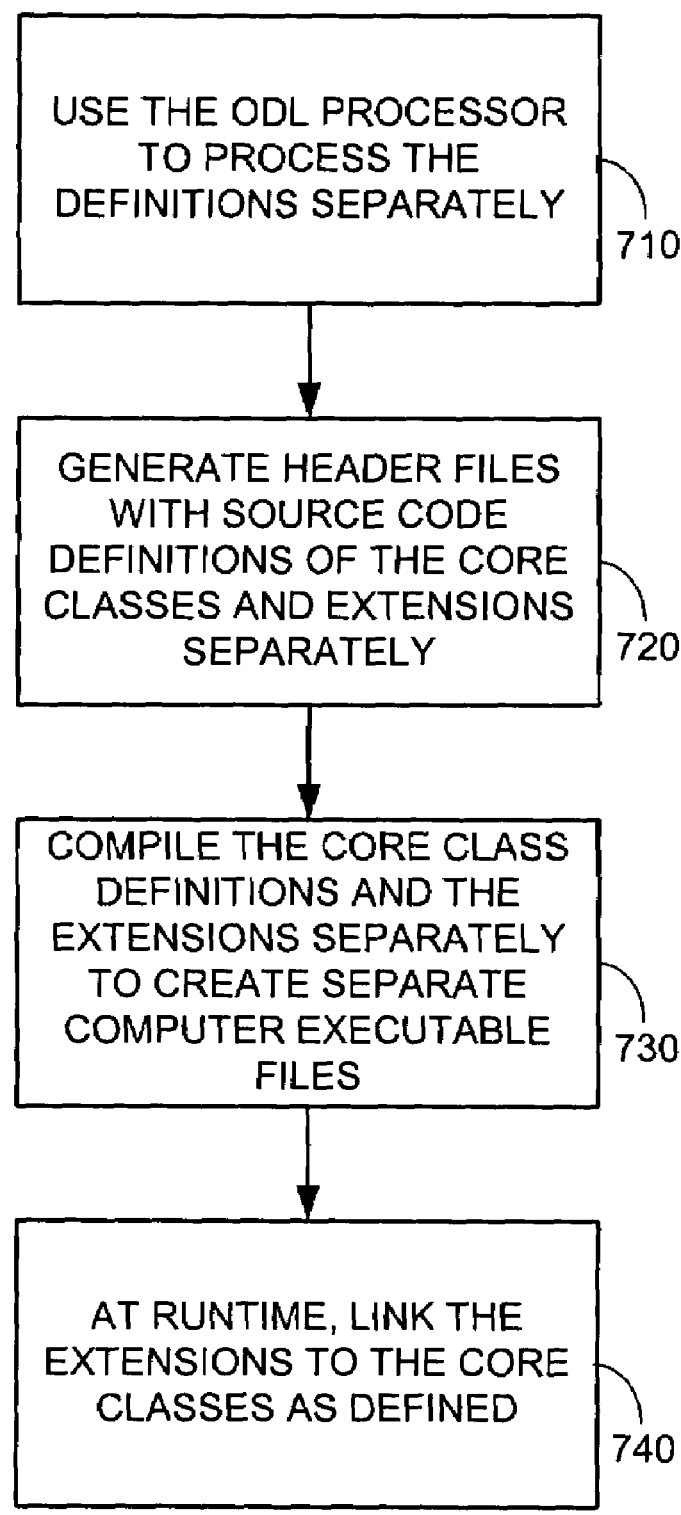
FIG. 7 is a flow chart of a method for dynamically extending a core software program.

FIG. 7 illustrates a method for extending a core class definition of a extensible core framework software program by linking the extension to the appropriate core classes at runtime. The core class definitions and the extensions may be expressed separately using an object description language. The description language may be suitable for expressing that a core class definition is dynamically extensible. Also, such a language may be suitable for expressing the associations between particular core class definitions and their extensions. Syntax for one such suitable language is described in further detail below. Once the definitions are expressed, an ODL pre-processor may be used at 710 to translate the definitions in the object description language representation to a source code representation at 720. However, unlike the static process (FIG. 6), in the dynamic process of FIG. 7, the core class definitions are not processed by the ODL pre-processor together with the definition of their extensions. Instead, source code header files corresponding to core class definitions and source code header files corresponding to class extension definitions are generated separately. These may be generated by different ODL pre-processors but it is not necessary to do so. Furthermore, at 730, the header files containing core class definitions and the header files containing the class extension definitions are compiled separately to create separate files that are executable by a computer. However, at 740, during runtime, the class extension definitions may be linked to the appropriate core class definitions to extend the core classes as defined.

Figure 8:
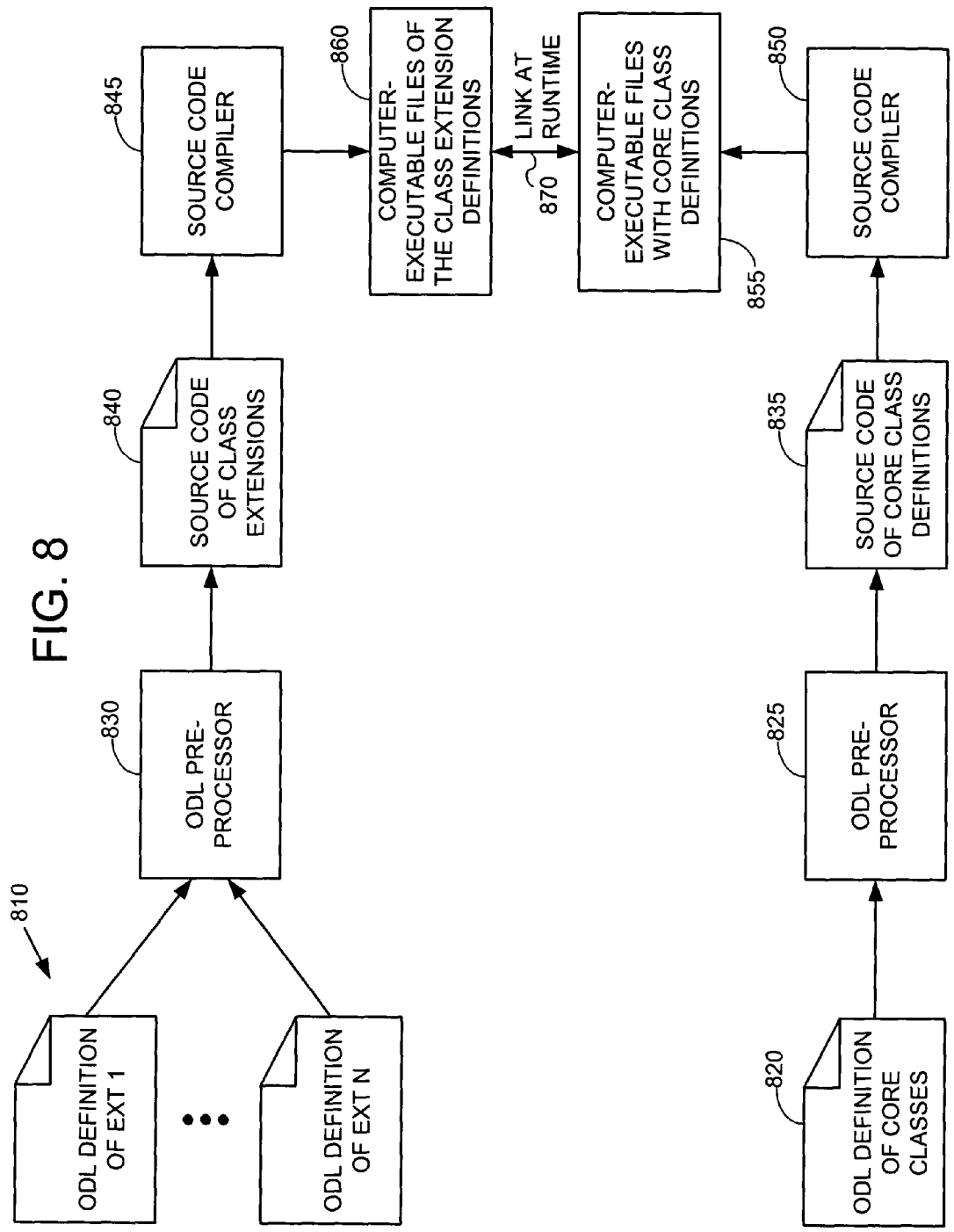
FIG. 8 is a block diagram depicting a system for dynamically extending a core software program as shown in FIG. 7.

FIG. 8 illustrates an exemplary system for implementing the process of FIG. 7. As shown in FIG. 8, the class extension definitions are provided in an object description language and stored in files 810. It is not necessary that each class extension be stored as a separate file as shown. The core class definitions are also provided in an object description language and stored in files 820. According to the process described in FIG. 7 an ODL pre-processor 825 is provided for processing the core class definitions by translating the core class definitions from an object description language representation to a source code language representation to be stored as header file 835. Similarly, yet another ODL pre-processor 830 may be provided for processing the class extension files 810 to generate source code header files 840 comprising class extensions. A source code compiler 845 may be provided for compiling the class extension header files 840 to generate a computer executable file 860 containing the class extension definitions. Similarly, a source compiler 850 may be provided for compiling the header files 835 containing the core class definitions to generate computer executable files 855 containing the core class definitions. Then at runtime, as the executable files corresponding to the core classes 855 and the executable files corresponding to class extensions are executed, the links 870 provided within the core and the extension classes can cause the core classes to be extended appropriately.

Object Description Language for Providing Statically Extensible Class Definitions As noted above, a simple object description language can be used to provide class definitions that are dependent on the desired configuration of an extensible core framework program. For example, the particular configuration of a core framework can place disparate demands on the class definitions based on software development scenarios such as the type of compiler (e.g., JIT, Pre-JIT, Native Optimizing etc.), type of target (e.g., IA-64, X86, ARM etc.) and other scenario factors. The next few sections describe such a language that can be processed by an ODL pre-processor to generate class definitions in a source code language as described with reference to FIGS. 5 through 8 above.

FIG. 9A depicts a standard class declaration using the object description language. In general, the declaration 900 comprises a header 911 and a body 912. The header may be used to declare the visibility of the class (e.g., public, private, etc.), the class name, etc. As shown at 913, the header also comprises an attribute definition enclosed within square brackets as the following example:

[attribute_name]

This declaration may be used to define the attributes of a class such as, whether it is a managed class (e.g., in a .NET scenario) or not and also, the extensibility attribute of the class. For example, defining whether it is a managed class may be done by declaring the [gc] attribute to indicate that the garbage collection for the objects of this class is automatically done (e.g., by the .NET framework). For class extensibility attribute, one approach is to assume that all classes are statically extensible as described above. Thus, no special attribute may be required to specifically declare that a class is statically extensible. However, as shown in FIG. 10A, a class that is to be extended at runtime (i.e. dynamically) may be declared with a specific attribute as such as [extensible].

In the example shown in FIG. 9A, the class SYM is a statically extensible class with core class members 914 and 915 in its body. The class 900 may be a core class and the class members TYPE 914 and NAME 915 may be class members that are common to all configuration dependent extended classes that rely on the core class. Once the core class 900 is defined, class extensions for generating an extended version of the core class definition for particular configuration of a core framework may be provided.

FIG. 9B shows two such class extension definitions 920 in an object description language. For simplicity, the form of a class extension is very similar to that of a core class declaration or definition. The extension 925 shows class members 926 related to a JIT compilation scenario for building a JIT compiler from a core framework. The JIT compilation scenario may need specific class members 926 such as interfaces, methods, and variables that are specific to the JIT compiler configuration but not necessarily so for other configurations. Thus, an extension 925 may be provided which, when processed by an ODL pre-processor, extends the core class definition of FIG. 9A. The keyword "extend" at 927 indicates that this is a static extension for the core class SYM. Also, the attribute specification [JIT] 928 indicates that the extension is only to be applied when extending the core framework to implement a JIT compiler.

Similarly, the extension 930 may be provided for adding class members 931 specific to building a tool for targeting an IA-64 processor. The two extensions 925 and 930 are independent of each other and may be provided by different parties and the extensions need not rely on each other in any way as may be the case with extending core class definition using traditional class-subclass dependencies. Moreover, the programmers do not need to keep track of complex dependency relationships.

Other extensions due to other factors maybe provided. For example, in an intermediate language for C++ there may be a need to link two function symbols together. This function may be added as an extension specific to software development tools configured to process the intermediate language for C++, wherein the extension would comprise a method for linking the two function symbols together.

The actual conditional implementation of the exemplary JIT compiler related extension 925 and the exemplary IA-64 target related extension 930 may be implemented when an ODL pre-processor generates a source code representation of the extended class definition as shown in FIG. 9C. The extended class 940 is shown not only having the original class members related to the core class definitions but it is now has the added class members 926 and 931. Thus, the extended class as shown is a class definition for a configuration of a JIT compiler for targeting an IA-64 processor. In the same manner, multiple different extensions based on multiple different software development scenarios can be conditionally added on to statically extend a core class. The extended core class 940 when compiled using an appropriate source code compiler will help generate a customized version of the core framework.

Object Description Language for Providing Dynamically Extensible Class Definitions One disadvantage of the static extensions is that it requires compiling the core framework and the extension together for generating one single file executable by a computer. This means those that are providing the extensions also need to have access to the source code of the core framework for recompiling it along with the extensions. To avoid this situation, which may not be desirable for a number of different reasons, extended class definitions may be generated at runtime.

FIG. 10A depicts one example of a class declaration using the object description language (ODL) to dynamically extend a core class definition based on a particular configuration of an extended version of a core framework. The core class definition for a class INSTR 1010 has a header with an attribute "extensible" at 1011 for indicating that this is a dynamically extensible class declaration. The body of the class declaration 1012 has class members that are common to the framework. However, the attribute [extensible] at 1011 when processed by an ODL pre-processor generates and injects an extension object to the source code that can serve as a place holder for adding further class members to be provided later at runtime by an appropriately linked extension. FIG. 10B illustrates one such extension 1020 associated with a particular target scenario. In this example, extension 1020 adds the HINTBITS 1021 and PREDICATES 1022 class extension members particular to implementing a software development tool for a IA-64 target processor. The attribute [IA-64] 1023 is used to indicate that this particular extension is only applicable to a customized configuration of a core compiler and tools framework targeted for an IA-64 processor. The keyword 1024 "extends" is added to indicate that the extension 1020 is a dynamic extension of the class INSTR at 1025.

As noted above, in the case of dynamically generating an extended class the core class definitions 1010 and the class extension definitions 1020 are processed to create separate source code representations of the core class definitions and their extensions. Also, these separate source code representations are later compiled separately to generate separate files executable by a computer. In this case, unlike the static extensions described above, class extension members needed to extend a core class definition are not simply added to the source code header files with the extended class definitions. Instead, as shown in FIG. 10C, other code 1031 may be added to GET and SET class extensions that the dynamically extensible class definition expects to be added to the core class definition 1010 at runtime. Thus, in comparison to a static extension, the dynamic extensions may have the added overhead of having to execute some additional procedures 1031 in order to appropriately extend a class definition at runtime. Thus, typically the dynamic extensibility reduces the speed of a process but on the other hand provides for additional flexibility for providing extensions because in this approach the core and the extensions may be compiled separately. This allows for third parties to provide extensions to core class definitions without needing access to the source code of the core framework.

FIG. 11A illustrates yet another example of a dynamically extensible core class definition 1110. The keyword "extensible" 1111 indicates that this class INSTR is extensible and the body of the class also provides the class members for the class prior to adding any extensions. One of the class member methods 1112 has a keyword "extension point" which indicates that one of the class extensions is to be incorporated at the indicated extension point 1112 by specifically defining the method or interface FOO().

FIG. 11B depicts a suitable dynamic extension 1120 for the extending the extensible class shown in FIG. 11A by providing not only the HINTBITS 1121 and PREDICATES 1122 class extension members needed for a configuration targeting an IA-64 processor but also the definition of the FOO() method 1123 indicated by the extension point 1112. The "extension point" key word provides for a finer grain of control for indicating the specific points of the core class definitions where extensions may be injected into. Furthermore, this can be done in a simple manner by the use of object definition language which automatically generates the appropriate pointers to the appropriate extensions. Similarly, extension points may also be represented in a statically extensible core class definition.

Exemplary Implementation for Customizing Software Development Tools

Figure 12:
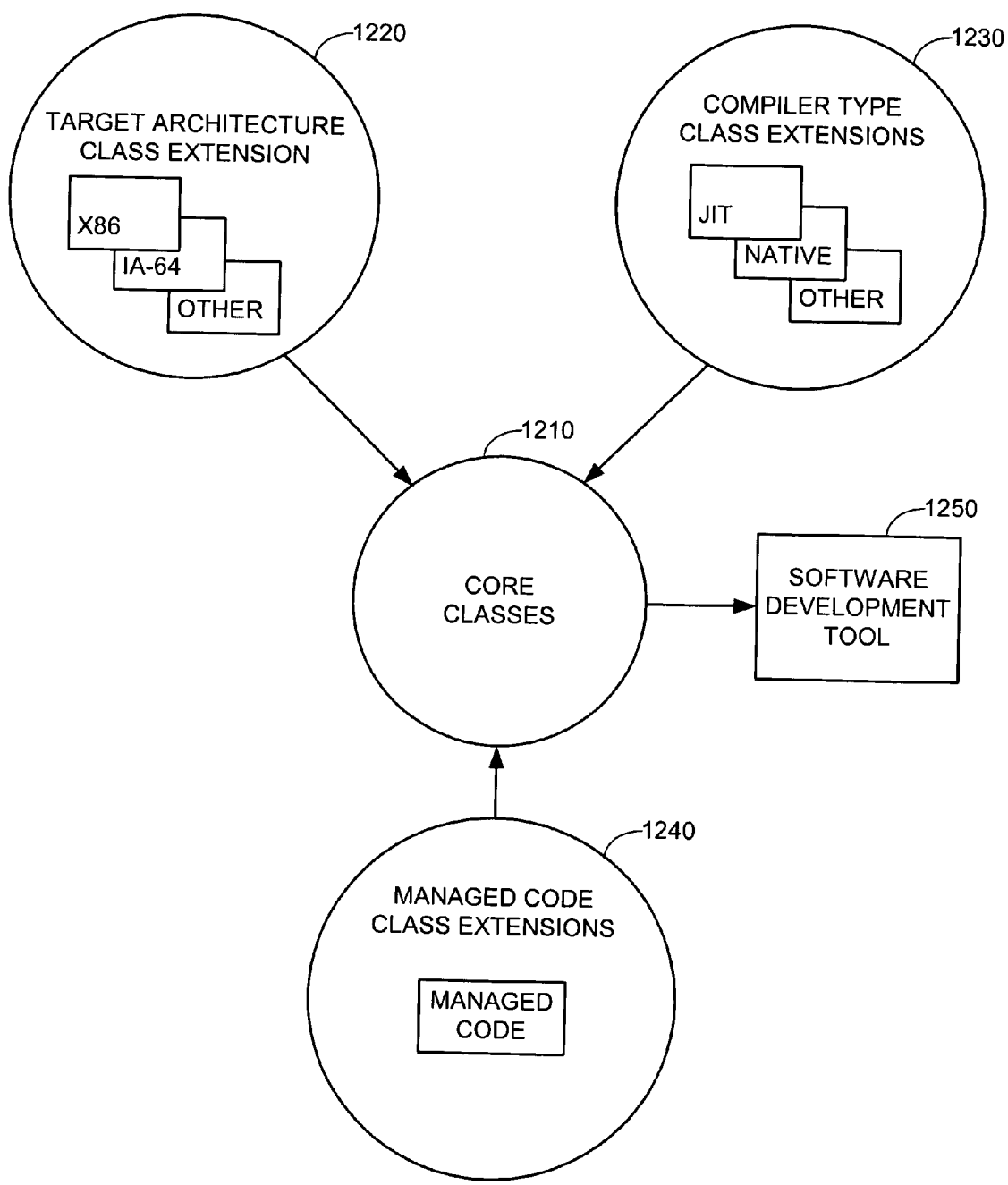
FIG. 12 is a block diagram illustrating exemplary implementation of constructing software development tools according to multiple software development scenarios.

FIG. 12 illustrates an exemplary implementation of constructing software development tools according to multiple software development scenarios. A core class 1210 may be extended by adding class extensions related to various software development scenarios. For example, the class extensions may be related to software development scenario of particular target architectures 1220 (e.g. X86, IA-64 etc.), and other extensions may be related to compilation scenarios 1230 (e.g., JIT, Native etc.). Similary, other software development scenarios may affect the choice of extensions. For example, there may be extensions particular to managed code implementation 1240 of a software development tool, or an extension may indicate one out of a set of programming languages. Thus, these various configurations of extensions can be added to extend a core class 1210 to build a software development tool 1250 using an extensible core framework.

ALTERNATIVES

Having described and illustrated the principles of our invention with reference to the described embodiments, it will be recognized that the described embodiments can be modified in arrangement and detail without departing from such principles. Although, the technology described herein have been illustrated via examples using compilers, any of the technologies can use other software development tools (e.g., debuggers, optimizers, simulators and software analysis tools). Furthermore, the principles of generating extensions have been primarily described herein with reference to extending core classes, but the same principles are equally applicable to extend any extensions or sub-classes of a core class. Also, the ODL processor is referred to above as being capable of receiving object description language and generating source code languages. The output of the ODL pre-processor however, need not be restricted just source code languages. It may also provide as output, intermediate representations or intermediate languages such as Microsoft.NET's CIL, or in any form executable by a processor.

Also, it should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of generating an extended version of software written in an object-oriented programming language which provides for object classes via a plurality of extensions to the software, the method comprising:

receiving invocations of a plurality of software development scenario class extension sets comprising extensions for respective software development scenarios to he implemented by the extended version of the software, wherein the respective software development scenarios specify a plurality of target processor architectures and a plurality of compilation scenarios; and extending one or more classes of the software as indicated by the extensions, wherein the extending comprises:

processing classes of the software indicated as being statically extensible together with their corresponding extensions to generate the extended version of the software, wherein the processing comprises:

using an object description language pre-processor to generate a header file with a source code representation of an extended class comprising the classes of the software and their corresponding extensions; and compiling the header file to generate the extended version of the software.

2. One or more computer-readable media having computer-executable instructions for performing the method of claim 1.

3. The method of claim 1 wherein the receiving for at least one of the extension sets occurs at runtime of the software.

4. The method of claim 1 wherein the extending comprises outputting source code for the extensions.

5. The method of claim 1 wherein the extension sets comprise:

an extension set for implementing a target architecture.

6. The method of claim 5 wherein the extension sets comprise:

an extension set for implementing a compilation scenario.

7. The method of claim 5 wherein the extension sets comprise an extension set for implementing a managed code scenario, and the method further comprises:

based on the receiving, extending the classes to provide managed code functionality.

8. The method of claim 1 wherein an invocation for at least one of the extension sets indicates is received at runtime.

9. The method of claim 1 wherein at least one of the extensions indicates an additional class member for at least one of the object classes of the software.

10. A method of extending software written in a programming language by adding extensions to a core version of the software to generate an extended version of the software, the method comprising:

receiving a configuration of the extended version of software;

receiving in an object description language definitions of extensions to classes of the core version of the software according to the configuration of the extended version of the software, wherein the classes of the core version of the software are indicated in the object description language as statically extensible prior to compile time or dynamically extensible at runtime, wherein the classes of the core version of the software indicated as being statically extensible are processed together with their corresponding extensions, and wherein the classes of the core version of the software indicated as being dynamically extensible are processed separate from their corresponding extensions; and processing the classes of the core version of the software and the extensions to generate the extended version of the software, wherein processing the classes of the core version of the software together with their corresponding extensions comprises:

using an object description language pre-processor to generate a header file with a source code representation of an extended class comprising the classes of the core version of the software and their corresponding extensions; and compiling the header file to generate the extended version of the software.

11. The method of claim 10, wherein processing the classes of the core version of the software separate from their corresponding extensions comprises:

using an object description language pre-processor for generating a header file comprising a source code version of the classes of the core version of the software; and compiling the header file to generate a computer executable version of the classes of the core version of the software.

12. The method of claim 10, wherein processing the classes of the core version of the software separate from their corresponding extensions comprises:

using an object description language pre-processor for generating a header file comprising a source code version of the extensions to classes of the core version of the software; and compiling the header file to generate a computer executable version of the extensions to classes of the core version of the software.

13. The method of claim 12, further comprising processing the computer executable version of the extensions to classes of the core version of the software to generate extended classes by linking the classes of the core version of the software to their respective extensions at runtime.

14. The method of claim 10, wherein the definition of the classes of the core version of the software comprises one or more extension points for indicating points within code related to the core version of the software where code related to the extensions to classes of the core version of the software is injected.

15. The method of claim 10, wherein the core version of the software is an extensible core compiler framework and the extended version of the software is a customized compiler and receiving the configuration of the extended version of the software comprises obtaining a compiler type.

16. The method of claim 15, wherein the compiler type is selected from a group consisting of a JIT compiler, a Pre-JIT compiler and a Native Optimizing Compiler.

17. The method of claim 10, wherein the core version of the software is an extensible core software development tool framework and the extended version of software is a customized software development tool and receiving the configuration of the extended version of software comprises obtaining a target type.

18. The method of claim 10, wherein the core version of the software is an extensible core software development tool framework and the extended version of software is a customized software development tool and receiving the configuration of the extended version of software comprises obtaining a feature type.

19. A system for extending software by adding extensions to a core version of the software to generate an extended version of the software, the system comprising:

a computer processor for executing an object description language pre-processor operable for receiving extensions to classes of the core version of the software in an object description language and generating a source code version of the extensions to classes of the core version of the software, wherein the classes of the core version of the software are indicated in the object description language as being dynamically extensible at runtime or statically extensible prior to compile time, wherein the object description language pre-processor is programmed for processing the classes of the core version of the software indicated as being dynamically extensible separate from their corresponding extensions, and wherein the object description language pre-processor is operable for processing the classes of the core version of the software indicated as being statically extensible together with their corresponding extensions to generate a header file with a source code version of extended classes comprising the source code version of the classes of the core version of the software and their corresponding extensions; and a compiler for compiling the header file with the source code version of the extended classes to generate a computer-executable version of the extended classes to be used for generating the extended version of the software.

20. The system of claim 19, wherein the classes of the core version of the software further comprise extension points for indicating locations within code related to the core version of the software where code related to the extensions are injected.

21. The system of claim 19, further comprising a compiler for compiling the source code version of the extensions to the classes of the core version of the software to generate a computer-executable version of the extensions.

22. The system of claim 21, further comprising a computer processor for executing the computer-executable version of the extensions to generate an extended version of the software at runtime by linking the classes of the core version of the software to their corresponding extensions.

23. The system of claim 22, wherein the processor executes the computer-executable version of the extensions by invoking a computer-executable version of the core version of the software and injecting the extensions into code related to the core version of the software at runtime.

24. The system of claim 19, wherein the extensions correspond to a configuration of the extended version of the software.

25. The system of claim 24, wherein the core version of the software is an extensible core software development tool framework and the extended version of software is a customized software development tool and the configuration of the extended version of software comprises a target type.

26. The system of claim 24, wherein the core version of the software is an extensible core software development tool framework and the extended version of software is a customized software development tool and the configuration of the extended version of software comprises a compiler type.

27. The system of claim 24, wherein the core version of the software is an extensible core software development tool framework and the extended version of software is a customized software development tool and the configuration of the extended version of software comprises a feature type.

28. A computer readable storage medium having stored thereon class declarations of classes of a core version of a software to be extended by extension declarations for extending the core version of the software to generate an extended version of the software, the class declaration of the core version of the software comprising:

one or more core class members; and one or more extensibility attributes of the core classes, wherein the extensibility attribute indicates that the core classes are either statically extensible prior to compile time or dynamically extensible at runtime, wherein processing the classes of the core version of the software together with their corresponding extension declarations comprises:

using an object description language pre-processor to generate a header file with a source code representation of an extended class comprising the classes of the core version of the software and their corresponding extension declarations; and compiling the header file to generate the extended version of the software;

wherein the extension declarations correspond to a particular configuration of the extended version of the software and the extension declaration further comprise one or more attribute declarations for indicating the configuration of the extended version of the software, and wherein the core version of the software is an extensible core software development tool framework and the extended version of software is a customized software development tool and the configuration of the extended version of software comprises choosing a target processor architecture.

29. The computer readable storage medium of claim 28, further comprising the extension declarations, wherein the extension declarations comprise one or more extension class members for extending the core version of the software.

30. The computer readable storage medium of claim 28, wherein the core version of the software is an extensible core software development tool framework and the extended version of software is a customized software development tool and choosing the configuration of the extended version of software comprises choosing a compiler type.

31. The computer readable storage medium of claim 28, further comprising extension points for indicating locations within code related to the core version of the software where code related to their corresponding extensions should be injected.

32. A computer readable storage medium having stored thereon software code for a pie-processor program, wherein the pre-processor program is operable for receiving, in an object description language, classes of a core version of a software and corresponding extensions to the classes of the core version of the software to be used for extending the core version of the software, wherein the classes of the core version of the software are indicated in the object description language as being statically extensible prior to compile time or dynamically extensible at runtime, wherein the pre-processor program is further operable for using the extensions of the classes of the core version of the software received in form of the object description language to generate a source code version of the extensions to be used for linking the extensions to their corresponding classes of the core version of the software at runtime to extend the core version of the software, and wherein the pre-processor program is further operable for using the classes of the core version of the software and their corresponding extensions received in form of the object description language to generate a header file with a source code version of extended classes comprising the classes of the core version of the software and their corresponding extensions, wherein the pre-processor program is further operable for outputting the header file to a compiler for generating an extended version of the software.

33. A system for extending software by adding extensions to a core version of the software to generate an extended version of the software, the system comprising:

for executing an object description language pre-processor for means for receiving extensions to classes of the core version of the software in an object description language and generating a source code version of the extensions to classes of the core version of the software, wherein the classes of the core version of the software are indicated in the object description language as being dynamically extensible M runtime or statically extensible prior to compile time, wherein the classes of the core version of the software indicated as being statically extensible are processed together with their corresponding extensions, wherein the classes of the core version of the software indicated as being dynamically extensible are processed separate from their corresponding extensions, wherein processing the classes of the core version of the software together with their corresponding extensions comprises:

using the object description language pre-processor to generate a header file with a source code representation of an extended class comprising the classes of the core version of the software and their corresponding extensions; and compiling the header file to generate the extended version of the software; and means for compiling the source code version of the extensions to classes of the core version of the software to be used for generating the extended version of the software.

* * * * *